(12) United States Patent
Lipman

(10) Patent No.: US 6,583,220 B1
(45) Date of Patent: Jun. 24, 2003

(54) BIOLOGICAL FLUID ABSORBING PRESSURE SENSITIVE ADHESIVES

(75) Inventor: Roger D. A. Lipman, Brasschaat (BE)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 09/486,618

(22) PCT Filed: Jul. 14, 1998

(86) PCT No.: PCT/GB98/02069
§ 371 (c)(1),
(2), (4) Date: Feb. 29, 2000

(87) PCT Pub. No.: WO99/11728
PCT Pub. Date: Mar. 11, 1999

(30) Foreign Application Priority Data

Aug. 29, 1997 (GB) .............................................. 9718289
Jun. 25, 1998 (GB) .............................................. 9813771

(51) Int. Cl.$^7$ ......................... A61L 15/00; C08J 153/02
(52) U.S. Cl. ............... 525/54.3; 525/54.31; 525/54.32; 525/88; 525/92 L; 525/98; 525/99
(58) Field of Search ............................. 525/54.31, 54.3, 525/54.32, 88, 92 L, 98, 99

(56) References Cited

U.S. PATENT DOCUMENTS

| | | | |
|---|---|---|---|
| 3,339,546 A | 9/1967 | Chen | 128/156 |
| 3,972,328 A | 8/1976 | Chen | 128/156 |
| 4,166,051 A | 8/1979 | Cilento et al. | 260/17.4 |
| 4,192,785 A | 3/1980 | Chen et al. | 260/17.4 |
| 4,204,540 A | 5/1980 | Cilento et al. | 128/283 |
| 4,231,369 A | 11/1980 | Sørensen et al. | 128/283 |
| 4,253,460 A | 3/1981 | Chen et al. | 128/283 |
| 4,367,732 A | 1/1983 | Poulsen et al. | 128/156 |
| 4,378,018 A | 3/1983 | Alexander et al. | 128/295 |
| 4,427,737 A | 1/1984 | Cilento et al. | 428/315.7 |
| 4,477,325 A | 10/1984 | Osburn | 204/159.12 |
| 4,496,357 A | 1/1985 | Osburn | 604/336 |
| 4,505,976 A | 3/1985 | Doehnert et al. | 428/355 |
| 4,538,603 A | 9/1985 | Pawelchak et al. | 128/156 |
| 4,551,489 A | 11/1985 | Bayha | 523/501 |
| 4,551,490 A | 11/1985 | Doyle et al. | 524/22 |
| 4,598,004 A | 7/1986 | Heinecke | 428/40 |
| 4,693,858 A | 9/1987 | Volke | 264/101 |
| 4,738,257 A | 4/1988 | Meyer et al. | 128/156 |
| 4,759,354 A | 7/1988 | Quarfoot | 128/156 |
| 4,768,503 A | 9/1988 | Highgate et al. | 128/156 |
| 4,952,618 A | 8/1990 | Olsen | 524/17 |
| 5,006,401 A | 4/1991 | Frank | 428/231 |
| 5,059,189 A | 10/1991 | Cilento et al. | 604/307 |
| 5,133,821 A | 7/1992 | Jensen | 156/245 |
| 5,270,358 A | 12/1993 | Asmus | 524/55 |
| 5,322,876 A | 6/1994 | Sasaki et al. | 524/17 |
| 5,369,130 A * | 11/1994 | Numata | 514/772.3 |
| 5,429,591 A | 7/1995 | Yamamoto et al. | 602/54 |
| 5,466,724 A | 11/1995 | Volke et al. | 523/111 |
| 5,492,943 A | 2/1996 | Stempel | 523/111 |
| 5,503,847 A | 4/1996 | Queen et al. | 424/488 |
| 5,534,561 A | 7/1996 | Volke | 523/111 |
| 5,545,154 A | 8/1996 | Oberholtzer | 604/336 |
| 5,554,106 A | 9/1996 | Layman-Spillar et al. | 602/42 |
| 5,569,207 A | 10/1996 | Gisselberg et al. | 604/175 |
| 5,571,080 A | 11/1996 | Jensen | 602/56 |
| 5,591,447 A | 1/1997 | Jensen | 424/443 |
| 5,622,711 A | 4/1997 | Chen | 424/445 |
| 5,633,010 A | 5/1997 | Chen | 424/448 |
| 5,662,924 A | 9/1997 | Rhodes | 424/445 |
| 5,674,578 A | 10/1997 | Giori | 428/35.4 |
| 5,830,497 A | 11/1998 | Yamanaka et al. | |
| 5,866,157 A * | 2/1999 | Higo et al. | 424/448 |
| 5,952,396 A * | 9/1999 | Chang | 525/193 |
| 6,146,654 A * | 11/2000 | Kubo | 424/443 |

FOREIGN PATENT DOCUMENTS

| | | |
|---|---|---|
| DE | 42 07 657 A1 | 9/1992 |
| EP | 0 122 344 A1 | 10/1984 |
| EP | 0 264 299 B1 | 4/1988 |
| EP | 0 272 149 B1 | 6/1988 |
| EP | 0 297 769 B1 | 1/1989 |
| EP | 0 344 913 A1 | 12/1989 |
| EP | 0 730 874 A2 | 9/1996 |
| GB | 1088992 | 10/1967 |
| GB | 1576522 | 10/1980 |
| GB | 2 089 351 A | 6/1982 |
| GB | 2 198 441 A | 6/1988 |
| WO | WO 91/13935 | 9/1991 |
| WO | WO 95/17166 | 6/1995 |
| WO | WO 98/01167 | 1/1998 |

* cited by examiner

Primary Examiner—Jeffrey Mullis
(74) Attorney, Agent, or Firm—Christie, Parker & Hale, LLP

(57) ABSTRACT

A pressure-sensitive adhesive material made of an elastic mixture comprising a continuous phase formed from a physically cross-linked solid rubber such as a styrene-olefin-styrene block copolymer, for example a styrene-isoprene-styrene block copolymer, and a compatible liquid rubber, such as a liquid styrene-isoprene, and a discontinuous phase substantially comprised of one or more "swellable polymers", absorbents that are swellable in water. Additives such as polybutenes, polyisobutylene, mineral oil, stabilizers and other rubbers, may be present. Water soluble polymers may be added to the swellable absorbents to form part of the discontinuous phase. The pressure-sensitive adhesives the advantage over the prior are that they avoid the need to include materials known to irritate skin and mucous membranes. In particular, prior art compositions have needed to include substantial quantities of tackifying resins, which could cause problems particularly in wound dressings. The preferred compositions of the invention include no resins although minor amounts of up to 15 wt. %, preferably not more than 5%, of resinous materials may be included. The adhesive layer can be combined with a non-adhesive, water impervious film and can be used in wound care, ostomy care and in other medical products.

18 Claims, No Drawings

BIOLOGICAL FLUID ABSORBING PRESSURE SENSITIVE ADHESIVES

This invention relates to pressure sensitive adhesive materials having particular utility in the medical field, for example for use with wound dressings and ostomy appliances.

Pressure sensitive adhesive materials are used in many medical device fields and are made into products such as tapes, bandages, surgical drapes, IV dressings and the like. Hydrocolloid pressure sensitive adhesives are medically useful adhesives that have been known for about 30 years and were originally developed as bandages for the oral cavity to aid in delivery of drugs to the gingiva. Hydrocolloid adhesives have been hitherto unique in that they are inherently adhesive and inherently absorbent. They are useful as wound dressings because they can be applied directly to open wounds and secured on the surrounding intact skin, and as skin barriers because they protect the peristomal skin of ostomy patients. Many hydrocolloid skin barriers are known and are used for these purposes. It is convenient to divide these into "integrated" compositions and "non-integrated" compositions. In this context, "integrated" means those compositions which substantially, retain their dimensional stability and form when saturated with wound exudate and/or other body fluid. "Non-integrated" means those compositions which become soft gels and amorphous as they become saturated with fluid.

Particularly in the area of wound dressings, the known hydrocolloid adhesives have a number of limitations. First, the absorption capacity of hydrocolloid dressings is normally insufficient to handle the large amount of exudate from certain especially chronic wounds. Second, hydrocolloid compositions, by definition, contain water soluble absorbents, which provide "wet tack" to the composition, and these leach out into the wound and may be absorbed into the body. Third, hydrocolloid compositions are normally opaque, and so the healing of the treated wound cannot be assessed until the dressing is changed. Fourth, the continuous phases used in many especially non-integrated hydrocolloid adhesives contain substantial quantities of low molecular weight elastomers such as polyisobutylene. The polyisobutylene is dispersed in the soft gel from a non-integrated hydrocolloid composition which remains in the wound after dressing removal. While the polyisobutylene is chemically saturated and thus inert, it is nevertheless thought that it may be incorporated into the growing cellular structure in, for example, healing chronic wounds and the polyisobutylene has been suggested as the cause of abnormal "foam cells" observed in the histology of such dermal tissues. Although these foam cells are not thought to be permanently harmful, it is important to eliminate any leachable material from these medically useful compositions.

The first hydrocolloid compositions to be described were non-integrated. U.S. Pat. No. 3,339,546 discloses compositions which are inelastic, and which are non-integrated, i.e. which do not maintain their dimensional stability and become amorphous when imbibed with wound fluid or other body fluid. A typical formulation taught by this prior art is the composition formed from low molecular weight polyisobutylene (40% by wt.), pectin (20% by wt.), sodium carboxymethyl cellulose (20% by wt.) and gelatine (20% by wt.). This formulation was used as a dressing for the gingiva but is also believed to be the basis of commercially successful skin barrier and wound care products. Such compositions form a soft gel when in contact with an exuding wound, and the resultant gel remains in the wound when the dressing is removed. This lack of integrity is a drawback. The remaining gel must be irrigated from the wound by the nurse who is performing the change of dressing, and this is both time consuming for the nurse and painful for the patient.

Notwithstanding the drawbacks of this prior art bandage, however, the compositions taught by U.S. Pat. No. 3,339,546 are extremely gentle to the intact skin. This is thought to be due to a number of factors. First, the compositions of this patent contain a relatively small number of components. On a statistical basis therefore, a fewer number of skin reactions can be expected. Second, the ingredients are usually food components or additives, and have a long history of use. Third, polyisobutylene contains a chemically saturated aliphatic carbon-carbon backbone, and therefore needs no stabiliser to reduce the degradation often seen in rubbery materials having chemical unsaturation in the backbone. Fourth, the compositions apparently maintain the skin moisture at an optimum level, by absorbing excess perspiration and reducing the amount of skin maceration that is normally associated with the wearing of a wound dressing for several days. Skin maceration leads to a reduction in the mechanical strength of the skin, and in turn leads, on removal of the bandage, to increased skin damage to the healthy skin surrounding the margin of the wound. This is often termed "mechanical irritation". The prior art compositions described below achieve the integration of the continuous phase for the most part at the expense of the gentle, "skin-friendly" character displayed by the compositions of U.S. Pat. No. 3,339,546.

The lack of integrity was a serious drawback in the use of dressings and barriers based on these early hydrocolloid compositions and much development was completed in efforts to overcome the deficiency. Thus, British Patent 1,576,522, corresponding to U.S. Pat. No. 4,231,369 describes improved hydrocolloid compositions that are integrated. There is provided a sealing material for ostomy use consisting of a hydrocolloid dispersed in a continuous phase of styrene-isoprene-styrene copolymer, or other thermoplastic elastomer such as an ethylene-propylene copolymer. Also present is a hydrocarbon tackifier and optionally an oil extender and an antioxidant. This material is said to have the advantage of being elastomeric and flexible, and thus bandages made from it should adhere well to the skin and be conformable. Because of the styrene-isoprene-styrene block copolymer the composition is integrated. The styrene-isoprene-styrene block copolymer forms physical cross links within the continuous phase at room temperature. This is because the polystyrene segments within the copolymer are incompatible with the polyisoprene segments, and they associate at room temperature to glassy domains which act as the physical cross links to form a three dimensional lattice. However, because of the larger number of components, and in particular the tackifying resin and stabilisers, the material does tend to experience more complaints with irritation than does the material from U.S. Pat. No. 3,339,546. Also, because the hydrocolloid absorbent components in British Patent 1,576,522 are normally at a lower concentration in the final formulation than are the hydrocolloid components in U.S. Pat. No. 3,339,546, a lower absorption level is obtained. The absorption rate is also slower, because the integrated nature of the composition makes that lower level of chemical hydrocolloid components even more slowly accessible to the body fluid.

The shortcomings of barriers and dressings based upon formulae such as are described in U.S. Pat. No. 3,339,546 are also recognised by both U.S. Pat. Nos. 4,477,325 and 4,738,257. These two later patents disclose barriers and dressings based on an integrated formulation containing a continuous phase composed of a blend of high vinyl acetate EVA copolymer (51% wt. VA and 49% wt. ethylene) and low molecular weight polyisobutylene, in which is dispersed a discontinuous phase containing a blend of a superabsorbent material, pectin and sodium carboxymethyl cellulose. The function of the EVA copolymer is to cross link in the presence of ionising radiation, such as gamma radiation at a dosage of, for example 25 KGy, which would be used to sterilise dressings formed from the compositions of the invention. The cross linked network is formed essentially from the EVA polymer by irradiation of the EVA containing elastomeric phase. The problem with this type of system is that the dose from such a sterilisation process is widely variable in practice. A company offering services for the sterilisation of medical devices to a nominal dose of 25 KGy would typically specify a dose within the range of say 25–35 KGy, so that some dressings would receive close to the lower amount while some would receive the higher amount. It will readily be appreciated that such variation will lead to a variable cross link density within different dressings of even the same production batch, which in turn will lead to variable performance in terms of rate and capacity of fluid absorption.

U.S. Pat. No. 4,551,490 describes integrated hydrocolloid adhesives modified by diluting the amount of styrene-isoprene-styrene block copolymer present in the composition. The patent provides a medical grade pressure sensitive adhesive composition comprising a heterogeneous mixture of one or more polyisobutylenes or blends of polyisobutylenes and butyl rubber, one or more styrene radial or block copolymers, a tackifier, mineral oil and one or more water soluble and/or swellable hydrocolloid gums. It is believed that the polyisobutylenes, butyl rubber, mineral oil and tackifier serve to modify and plasticise predominantly the isoprene segment of the block/radial copolymer. In particular, the mineral oil is said to provide increased extensibility and aggressiveness of the adhesive. It is believed that the teachings of this patent form the basis of the commercially available hydrocolloid dressing products DuoDerm and Signa Dress. However, it has been found that the rates of absorption of saline with these compositions is very slow, and not very reproducible, and moreover very much less than the absorption levels available within the compositions of U.S. Pat. No. 3,339,546.

All prior art cited above is believed to form the basis of commercially available hydrocolloid dressings and skin barriers. All the prior art discussed above discloses modifications to the continuous phase to achieve integrated compositions. The integrated continuous phase is achieved in each case only at the expense of one or other of the beneficial properties of the non-integrated composition described in U.S. Pat. No. 3,339,546.

The prior art cited above seeks to improve the integrity of hydrocolloid type compositions by modifying the continuous phase. A different approach was taken in the art described in U.S. Pat. No. 4,192,785, which describes incorporating into the hydrocolloid discontinuous phase a cohesive strengthening agent such as natural or synthetic fibrous material and other insoluble absorbent polymers to integrate this phase. The cohesive strengthening agent functions in the adhesive composition by decreasing the tendency to tearing and by decreasing the tendency to erosion and disintegration by biological fluids. Thus the swelling of the hydrocolloids is controlled.

U.S. Pat. No. 4,952,618 discloses adhesives containing preferably water soluble polycationic hydrocolloids such as a chitosan salt and DEAE Dextran mixed with polyanionic and neutral hydrocolloids such as pectin and gelatin, respectively. These compositions are said to possess high integrity.

However, the continuous phases described in both the above patents are "conventional" in that they are similarly composed preferably of a mixture of low molecular weight polyisobutylene and high molecular weight rubber—butyl rubber in U.S. Pat. No. 4,192,785 and high molecular weight polyisobutylene rubber in U.S. Pat. No. 4,952,618 respectively.

The present invention consists in a pressure-sensitive adhesive material comprising a mixture of (a) a continuous phase formed from a physically cross-linked solid rubber and a compatible liquid rubber; and (b) 10–70% by weight, based on the total adhesive material of a discontinuous phase comprising one or more hydrophilic polymers that are soluble and/or swellable in water.

The adhesive material of the present invention has an integrated continuous phase that can overcome some of the problems associated with the prior art. The pressure sensitive adhesives have the advantage over the prior art integrated adhesives that they do not require the presence of materials known to irritate skin and mucous membranes and they have a low propensity for allergic reaction. Compositions may be formulated within the scope of the invention that have no leachable components that would contaminate a healing wound, and they can be used in wound care, ostomy care and other medical products. By judicious choice of ingredients within the scope of the invention, compositions can be formulated that are relatively clear or translucent, and so are able to allow a visual assessment of the healing progress and the condition of a wound under a dressing. The content of resinous materials should not exceed 15% by weight, preferably 5% by weight, and in the more preferred embodiments of the invention resinous materials are avoided altogether, but other rubbers and, additives such as mineral oil and low molecular weight polymers may be present.

Compositions can be made according to the invention that are integrated but have absorption rates and capacities comparable with those observed for non-integrated compositions.

The present invention also provides barriers and wound dressings comprising a layer of the absorbent adhesive defined above coated on a non-adhesive, waterproof film. This construction is useful in a number of ways. One of these is for bandaging purposes, especially on movable body parts such as joints or on curved surfaces of the body. Wounds such as blisters, burns, venostasis ulcers and decubitus ulcers may advantageously be treated with the products of the invention. Another important use is for the protection of the skin around body openings, especially around the surgically created openings known as colostomies, ileostomies and urostomies.

A fluid absorbing adhesive according to the invention comprises a continuous phase consisting of one or more solid, physically cross linked thermoplastic elastomer components such as styrene-olefin-styrene and/or styrene-alkane-styrene copolymers and a liquid rubber component which, at least in preferred embodiments, is substantially resin free. The continuous phase provides "dry tack" to adhere the adhesive to dry, i.e. not moist, skin. Dispersed within the continuous phase is a discontinuous phase consisting substantially of absorbent polymer. Useful as the absorbent polymer are for example insoluble calcium alginate and synthetic insoluble absorbents such as crystalline sodium carboxymethyl cellulose. Water-soluble hydrocolloids may also be used for this phase.

The continuous phase may include solid rubbers such as linear or radial A-B-A block copolymers or mixtures of these A-B-A block copolymers with simple A-B block copolymers. However, the proportion of A-B block copolymers, relative to the A-B-A block copolymers should not normally exceed 85% by weight and lower amounts such as 10 to 50% by weight would normally be used. These block copolymers can be based on styrene-butadiene, styrene-isoprene, and hydrogenated styrene-diene copolymers such as styrene ethylene-butylene.

Suitable styrene-diene copolymers for the practice of the invention are exemplified by a blend of linear styrene-isoprene-styrene triblock copolymer and linear styrene-isoprene diblock copolymer. Such a material is available from Shell Chemical as Kraton D-1161 and has a bound styrene content of about 15% and a diblock content of 17%. A second example is a blend of linear styrene-isoprene-styrene triblock copolymer and linear styrene-isoprene diblock copolymer available from Shell Chemical as Kraton D-1117 and which has a bound styrene content of about 17% and a diblock content of 33%.

An example of a suitable hydrogenated styrene-diene copolymer is a thermoplastic elastomer comprising a blend of clear linear triblock and diblock copolymer based on styrene and ethylene-butylene with a bound styrene of 14% mass. Such a material is commercially available from Shell Chemical Company as Kraton G-1657. Another example is Kraton G-1652 from Shell Chemical Company, which is a thermoplastic elastomer comprised of a clear linear triblock copolymer based on styrene and ethylene-butylene, S-E/B-S, with a bound styrene content of about 30% by weight. Also suitable are polymers in which there is a combination of chemically saturated blocks and chemically unsaturated blocks. For example, a branched copolymer consisting of two polyisoprene chains attached to the rubber midblock of a styrene/ethylene-butylene/styrene triblock copolymer. Such a material is available from Shell Chemical Company as Kraton Research Product RP6919. This material has a styrene content of 18%, and isoprene content of 36% and an ethylene-butylene content of 46% by weight. Also, a low styrene synthetic copolymer of butadiene and styrene, commonly called SBR rubber, can be used as a solid rubber.

Liquid rubbers useful-in the invention include synthetic liquid isoprene rubber, depolymerised natural rubber, various functionally terminated synthetic liquid isoprene-styrene rubbers and liquid isoprene rubbers, liquid isoprene-styrene copolymer, liquid isoprene-butadiene copolymer, liquid butadiene-styrene copolymer and hydrogenated versions of these materials such as liquid ethylene-propylene-styrene. These liquid rubbers are characterised in that they are completely compatible with the solid rubber. The liquid rubbers typically have a molecular weight of 25000 to 50000, a glass transition temperature of less than −50° C., and a viscosity at 38° C. of 50 to 10000 Pas. A block copolymer of styrene and isoprene having a styrene content of about 13% and an isoprene content of about 87%, a glass transition of about −600° C., a melt viscosity of about 240 Pas at 50° C. and which is commercially available from Shell Chemical Company as LVSI-101, is particularly useful in the practice of the invention. Within the continuous phase, the preferred weight ratio of solid rubber to liquid rubber is in the range from 1:0.5 to 1:7, and is varied in order to obtain the desired degree of adhesiveness and tackiness.

Other materials may be added to the continuous phase to modify the properties for certain uses. Materials such as low molecular weight polybutenes, commercially available under the tradenames Parapol 1300 (Exxon) or Hyvis 30 (BP), low molecular weight polyisobutylene, rubbers such as butyl rubber and high molecular weight polyisobutylene, mineral oil, and small amounts of other optional ingredients may be added. The optional low molecular weight polyisobutylene may be selected from one or more low molecular weight polyisobutylenes having a viscosity average molecular weight of from 36,000 to 70,000. Such polyisobutylenes are commercially available under the trademark Vistanex from Exxon Chemical as grades LMMS, LMMH and LMH, having viscosity average molecular weights of about 45,000, 53,000 and 63,000 respectively. The optional low molecular weight polyisobutylene may be present in an amount corresponding to from 0% wt. to about 80% weight of the continuous phase. Optionally, an elastomeric polymer such as butyl rubber or high molecular weight polyisobutylene may also be blended into the continuous phase. The optional butyl rubber may be used in the viscosity average molecular weight range of 200,000 to 600,000 and is exemplified by the grades Butyl 065 or Butyl 077, both available from Exxon Chemical. The optional high molecular weight polyisobutylene may be used in the viscosity average molecular weight range of 800,000 to 2,500,000 and is exemplified by the Vistanex MM series of products, available from Exxon Chemical, with the MM L-80 grade being a preferred grade for the optional high molecular weight polyisobutylene. The optional high molecular weight rubbers, blended as is indicated above, may be added in amounts suitable to modify various properties of the final formulation and may be from 0% to about 50% of the total weight of the continuous phase. The optional low molecular weight polybutenes and/or mineral oil may be added in amounts from 0% to about 20% of the weight of the continuous phase.

The addition of polymer stabilisers can be advantageous, to protect an unsaturated elastomer from degradation during processing. Suitable stabilisers useful in the practice of the invention include those normally indicated for use with styrene-olefin-styrene block copolymer thermoplastic elastomers such as organophosphites and the so-called hindered phenols, but any suitable stabilisers may be employed. An example of an organophosphite stabiliser is tris(nonylphenyl) phosphite, available as Polygard HR, manufactured by Uniroyal. Particularly useful are the hindered phenols, Irganox 1010 and Irganox 565, manufactured by Ciba. Irganox 1010 is benzenepropanoic acid, 3,5-bis(1,1-dimethylethyl)-4-hydroxy-2,2-bis[[3-[3,5-bis(1,1-dimethylethyl)-4-hydroxyphenol]-1-oxopropoxy]methyl]-1,3-propanediyl ester. Irganox 565 is phenol, 4-[[4,6-bis(octylthio)-1,3,5-triazine-2-yl]amino]-2,6-bis(1,1-dimethylethyl)-. Stabilisers may be used separately or in combination, and suitable ranges are within 0.3–1.5% by weight based on the total formulation. The stabilisers are always added to the continuous phase, as is shown in the examples.

The discontinuous phase comprises one or more hydrophilic polymers that are soluble or which absorb and/or are swellable in water. One or more such polymers may be present and a mixture of soluble and insoluble polymers can be used. Suitable swellable polymers include cross-linked sodium carboxymethyl cellulose, crystalline sodium carboxymethylcellulose, cross-linked dextran and starch-acrylonitrile graft copolymer. The swellable polymer may also be a so-called "super absorbent" material such as starch sodium polyacrylate. Other hydratable polymers such as gluten and polymers of methyl vinyl ether and maleic acid and derivatives thereof may also be included in the discontinuous phase.

The discontinuous phase may also comprise one or more water-soluble hydrocolloids, alone or blended with one or more swellable polymers. Such soluble hydrocolloids include naturally derived products such as pectin, gelatin, starches, guar gum, locust bean gum, gum arabic, collagen, karaya gum, alginic acid and its sodium and/or calcium salts. Also useful are the synthetic hydrocolloids such as sodium carboxymethyl cellulose, cross linked sodium carboxymethyl cellulose, polyvinyl alcohol, polyvinyl pyrrolidone, high molecular weight polyethylene glycols and polypropylene glycols.

The amount of hydrophilic polymer phase may be from 10% to 70% of the total weight of the adhesive, normally from 20% to 55% of the total adhesive by weight.

The hydrophilic polymer functions as the absorbent, and to provide the "wet tack" that ensures the adhesive adheres to the skin and to mucous membranes when they are moist. The hydrophilic polymer must be capable of swelling in water, and transporting water.

Other optional ingredients such as silica and optional active ingredients such as growth factors, antimicrobial compounds and wound-healing components such as collagen may also be incorporated into the compositions of the invention.

The adhesive compositions of the invention may be prepared as follows. The solid rubber, for example a styrene-olefin-styrene copolymer and the liquid rubber component are blended together in a suitable mixer, normally a sigma blade mixer with an extruder discharge. The mixer is heated to about 170° C. A nitrogen flow of about 60 ml/sec through the mixer reduces the possibility of oxidative degradation of the rubber during processing. About 1% phr of a suitable stabiliser, say Irganox 1010 available from Ciba-Geigy, can be added at this stage. Normally a small amount of the liquid rubber, say 10–20%, is added to the whole amount of the solid rubber and the liquid rubber is allowed to blend with the soft solid rubber. When all this 10–20% of the liquid rubber has been absorbed, another portion of the liquid rubber is added, say 20–30%, and the liquid rubber is absorbed into the styrene-olefin-styrene rubber. This is continued until all the liquid rubber is added, when a pourable tacky intermediate adhesive is obtained. The mixer blades are stopped, the direction of the screw is reversed, and the intermediate adhesive is removed from the mixer. It is run off into suitably release coated containers and allowed to cool. The mixer is stabilised at 90° C. and the powdery ingredients are charged to the mixer and the other optional ingredients, if present, can be added, and blended-in for a period of time. After mixing at 90° C. for 20–30 minutes, the mixer temperature is raised to 105° C., and the ingredients of the continuous phase, intermediate hot melt and other low and high molecular weight rubbers if present, can then be added. If high molecular weight rubbers are used, they may need to be premasticated in the mixer, or premilled on a rubber mill. Mixing is continued normally for a further 30 minutes or so. The fully mixed mass is then removed from the mixer and then extruded or pressed to the desired thickness, and then laminated to suitable substrates.

The invention will be further illustrated by means of the following examples.

EXAMPLES 1 AND 2

An intermediate adhesive polymer mixture was made up having the composition shown in Table 1.

TABLE 1

| Formula No. 132A | wt % total | Amount in Mix, gm |
|---|---|---|
| LVSI-101 | 59.8 | 300 |
| Kraton KD-1161N | 39.8 | 200 |
| Irganox 1010 | 0.4 | 2 |
| | 100 | 502 |

The mixer was purged with nitrogen gas and heated to 160° C. The speed of the front, faster, blade was 30 rpm. The Kraton KD-1161N and the Irganox 1010 were charged to the Mixer at 160° C., and the mixer was started. After mixing for 5 minutes, the rubbery crumb coalesced, and 50 gm. of the LVSI-101 was added with continued mixing and nitrogen purging. After a further ten minutes, the temperature was raised to 170° C. and the mixer front blade speed increased to 47 rpm. The LVSI-101 had at this point completely mixed with the rubber, and a further 51 gm of LVSI-101 was added. 10 minutes later, after blending of the second portion of the LVSI, a further 48 gm of LVSI was added, and mixed for a further 10 minutes. In this way, approximately 50 gm portions of the charge of LVSI were added every 10 minutes until all the 300 gm had been added. 15 minutes later, the intermediate adhesive was dumped from the mixer. The total time for this operation was about 90 minutes.

From this intermediate mixture, referred to as Formula No. 132A in Table 1, two finished hydrocolloids were made having the composition shown in Table 2. The Aquasorb A500 is crystalline sodium carboxymethyl cellulose available from Aqualon, Division of Hercules Chemical. All weights are in grams:

TABLE 2

| Example No. | Formula No. | Vistanex LMMH | NaCMC 7H4XF | Prectin USP 100 | Aquasorb A500 | 132A |
|---|---|---|---|---|---|---|
| 1 | 136B | 112 | 56 | 56 | 56 | 120 |
| 2 | 137C | 40 | 20 | 20 | 20 | 181 |

The mixer temperature was reduced to 90° C., the hydrocolloid powders were placed in the mixer and the mixer started to mix the powders uniformly. No nitrogen purge was used in this phase of the preparation. The Vistanex LMMH was added, and the mix blended for 10 minutes, after which the intermediate mixture, referred to as 132A in the Table above, was added. Blending was continued for a further 30 minutes, and the finished formulation was removed from the mixture with a spatula. The finished hydrocolloid was pressed between two sheets of silicone release paper in a hydraulic press with the platens maintained at 90° C.

EXAMPLE 3–7

In a similar manner to examples 1 and 2, intermediate adhesives were prepared having the compositions shown in Table 3.

TABLE 3

| Formula No. Amount gm | E1 | E2 | E3 | E4 | E5 |
|---|---|---|---|---|---|
| LVSI-101 | 100 | 150 | 200 | 150 | 150 |
| Kraton D-1117 | 100 | 100 | 100 | — | — |

TABLE 3-continued

| Formula No. Amount gm | E1 | E2 | E3 | E4 | E5 |
|---|---|---|---|---|---|
| Kraton D-1119 | — | — | — | 100 | — |
| Kraton D-1112 | — | — | — | — | 100 |
| Irganox 1010 | 1.5 | 1.5 | 1.5 | 1.5 | 1.5 |

Kraton D-1119 is a mixture of linear diblock and triblock styrene-isoprene-styrene and styrene-isoprene copolymers having a styrene content of 22% and a diblock content of 66%.

Kratron D-1112 is a mixture of diblock and triblock styrene-isoprene-styrene and styrene-isoprene copolymers having a styrene content of 15% and a diblock content of 38%.

From the above intermediate adhesives, the following hydrocolloid compositions were prepared as Examples 3–7. Their compositions are set out in Table 4, in which all are in grams:

TABLE 4

| Example No. | Note-book Ref. | Vistanex LMH | NaCMC 7H4XF | Pectin USP 100 | Aquasorb A500 | E1-5 |
|---|---|---|---|---|---|---|
| 3 | | 112 | 56 | 56 | 56 | E1,120 |
| 4 | | 112 | 56 | 56 | 56 | E2,120 |
| 5 | | 112 | 56 | 56 | 56 | E3,120 |
| 6 | | 112 | 56 | 56 | 56 | E4,120 |
| 7 | | 112 | 56 | 56 | 56 | E5,120 |

EXAMPLE 8

An intermediate adhesive was prepared having the composition set out in Table 5, using RP-6919, a product manufactured by Shell Chemical Company which has the trade name Tacky G. This branched polymer consists of two polyisoproprene chains attache to the rubber midblock of a styrene/ethylene-butylene/styrene triblock copolymer. It has a styrene content of 18%, an isoprene content of 36% and an ethylene-butylene content of 46%, in each case by weight.

TABLE 5

| Component | Weight in grams |
|---|---|
| Tacky G RP6919 | 200 |
| Irganox 1010 | 3 |
| Hyvis 30 | 152 |
| LVSI-101 | 205 |

The Tacky G (200 gm) was mixed with the Irganox 1010 (3 gm) in the sigma blade mixer with under nitrogen gas blanket to minimise any thermal and oxidative degradation of the polymer during processing. The polymer was heated to 190° C. and the ingredients shown in Table 6 were added at the times indicated after starting.

TABLE 7

| Example No. | Formula No. | Vistanex LMMH | NaCMC 7H4XF | Pectin USP 100 | Aquasorb A500 | 152A |
|---|---|---|---|---|---|---|
| 8 | | 112 | 56 | 56 | 56 | 120 |

The Vistanex LMMH, the sodium carboxymethyl cellulose, the pectin and the Aquasorb A500, were first mixed together for 20 minutes, then the intermediate adhesive was added in the quantity shown and the blend further mixed for a period of 35 minutes. The finished adhesive composition was removed from the mixer, placed between two sheets of silicone release paper and pressed between the platens of a hydraulic press at 90° C. to give a sheet of hydrocolloid adhesive, which was then hand laminated to a polyurethane film of 25 $\mu$m thickness. The film used was Platilon UO4, which is a polyurethane film manufactured by Atochem, and which comes laminated to a removable polyethylene carrier film for ease of handling. The polyurethane side of the composition film laminate was coated with a medical grade acrylic adhesive at a coating weight of 30 g/m$^2$ in order to provide a "tie coat" to bond the polyurethane film to the surface of the hydrocolloid adhesive. After lamination, the polyurethane carrier film was stripped away from the polyurethane film, and the resultant finished laminate was die cut into 10×10 cm squares for use as hydrocolloid dressings. The squares were packaged in polyester trays with a peelable lidding of polyethylene coated paper, and the packed dressings were sterilised by exposure to gamma radiation at a minimum dose of 25 KGy.

EXAMPLES 9 AND 10

Preparation of Intermediate Hot Melt Adhesive

TABLE 8

| Formula No. 2-18A | wt % total | Amount in mix, gm |
|---|---|---|
| LVSI-101 | 79.37 | 400 |
| Kraton KD-1161N | 19.84 | 100 |
| Irganox 1010 | 0.79 | 4 |
| | 100.00 | 504 |

The mixture was purged with nitrogen gas and heated to 160° C. The speed of the front, faster, blade was 30 rpm. The Kraton KD-1161N and the Irganox 1010 were charged to the mixer at 160° C. and the mixer was started. After mixing for 5 minutes, the rubbery crumb coalesced, and 50 gm of the LVSI-101 was added with continued mixing and nitrogen purging. After a further 10 minutes, the temperature was raised to 170° C. and the mixer front blade speed increased to 47 rpm. The LVSI has at this point completely mixed with the rubber, and a further 51 gm of LVSI was added. Ten minutes later, after blending of the second portion of the LVSI, a further 48 gm of LVSI was added, and mixed for a further 10 minutes. In this way, approximately 50 gm portions of the charge of LVSI were added every 10 minutes until all the 400 gm had been added. 15 minutes later, the intermediate adhesive was dumped from the mixer. The total time for this operation was about 90 minutes.

From this intermediate mixture, referred to as Formula No. 2-18A in Table 8, two finished hydrocolloids were made having the following formulae. The Aquasorb A500 is crystalline sodium carboxymethyl cellulose available from Aqualon, division of Hercules Chemical. The Aerosil 200 is fumed silica available from Degussa AG. All weights are in grams:

TABLE 9

| Example No. | Vistanex LMMH | Aquasorb A500 | Formula 2-18A | Aerosil 200 silica |
|---|---|---|---|---|
| 9 | 65.6 | 98.5 | 164.1 | 10.2 |
| 10 | 65.6 | 98.5 | 164.1 | 6.7 |

The mixer temperature was reduced to 90° C. and the absorbent powder and silica was placed in the mixture and the mixer started. No nitrogen purge was used in this phase of the preparation. The Vistanex LMMH was added, the temperature raised to 105° C., the mix blended for 10 minutes, after which the intermediate adhesive, referred to as 2-18A in the Table above, was added. Blending was continued at 105° C. for a further 30 minutes, and the finished formulation was removed from the mixer with a spatula. The finished hydrocolloid was pressed between two sheets of silicone release paper in a hydraulic press with the platens maintained at 90° C.

EXAMPLES 11 AND 12

The following LVSI-101 based hot melt adhesive was prepared—weights are in grams:

TABLE 10

| Formula No: Amount gm: | 2-52A |
|---|---|
| LVSI-101 | 20000 |
| Kraton KD-1161N | 5000 |
| Irganox 1010 | 200 |

From adhesive 2-52A, the Examples 11 and 12 were prepared. All weights are in grams:

TABLE 11

| Example No. | Pectin USP 100 | NaCMC 7H4XF | Aquasorb A500 | Formula 2-52A |
|---|---|---|---|---|
| 11 | 3270 | 3270 | 3270 | 25200 |
| 12 | — | — | 9800 | 25200 |

The formulated adhesives were extruded at 100° C. on to a silicone coated release paper, calendered down to a gauge of 0.45 mm and laminated to an acrylic adhesive coated polyurethane film. The acrylic adhesive on the polyurethane film served as a tie coat to anchor the absorbent adhesive to the film.

EXAMPLE 13

An LVSI-101 based hot melt formulation, designated 2-66A, was prepared:

TABLE 12

| 2-66a | wt % total | Amount in Mix, gm |
|---|---|---|
| LVSI-101 | 79.37 | 18400 |
| Exxon Vector 4111 | 19.84 | 4600 |
| Irganox 1010 | 0.79 | 184 |
| Total | 100 | 23184 |

An alternate S-I-S rubber, Vector 4111, available from Exxon Chemical Company, was used in order to maximise shear strength since the Vector 4111 is a pure triblock polymer, whereas the Kraton D-1161NS is Largely diblock. The hot melt was processed further as follows:

TABLE 13

| | wt % total | Amount in Mix, gm |
|---|---|---|
| Vistanex LMMH | 28 | 168 |
| GenuPectin USP 100 | 14 | 84 |
| Blanose 7H4XF | 14 | 84 |
| Aqualon A500 | 14 | 84 |
| 2-66A | 30 | 180 |
| Total | 100 | 600 |

The adhesives of the Examples 9 to 13 were evaluated against a commercially available hydrocolloid adhesive, Commercial Product 1, and the following test results were obtained on these formulations:

TABLE 14

| | Example 9 | Example 10 | Example 11 | Example 12 | Example 13 | Commercial Product 1 |
|---|---|---|---|---|---|---|
| Reverse tack N/in | 11.2 | 23.8 | 12.3 | 12.5 | 15.0 | 14.0 |
| Peel 90° S.S. N/in | 3.1 | 12.0 | 5.0 | 4.7 | 7.1 | 9.9 |
| Shear 0.5 kg, min | >3000 | — | 250 | 433 | 497 | 141 |
| Thickness, mm | 0.47 | 0.63 | 0.41 | 0.45 | 1.07 | 0.43 |
| Static Absortion gm/m$^2$/24 hr | 3010 | — | 2021 | 2876 | 5629 | 2545 |
| Cold flow 23° C., % | 0.5 | — | 1.0 | 0.7 | — | 0.7 |
| Cold flow 40° C., % | — | 1.8 | — | — | — | — |

The data show clearly that the products of the invention show improved properties over the commercial material. For instance, Example 9 has improved shear strength, important for use of these adhesives as barriers for ostomy pouches, Example 10 has greater tack, while the adhesives of Examples 9 and 10 show reduced peel adhesion, important for gentle removal of dressings from the often compromised skin around chronic wounds, e.g. venostasis ulcers. Note that the Example 11 adhesive still possesses higher shear adhesion than the commercial product.

Test Methods

The test results given above were obtained using the following test methods.

Reverse Tack

Reverse tack of hydrocolloid adhesives is the maximum force necessary to remove a standard polyester strip brought into contact with the hydrocolloid without external force, from this hydrocolloid surface.

Procedure

Make the test panel self-adhesive using double coated tape. Laminate the hydrocolloid adhesive on the test panel. Place the test panel with hydrocolloid in the lower clamp of a tensile testing machine. Program the tensile tester. Place a polyester test strip of thickness 125 μm (5 mils) and dimensions (21 cm×2.54 cm) in the upper clamp, making sure that the total length of polyester under the clamp (loop) is 15 cm. Remove the release liner from hydrocolloid and start the measurement.

The reverse tack is the maximum force to remove the polyester strip from the hydrocolloid surface.

90° Peel Adhesion of Hydrocolloid Adhesives on SS

Peel adhesion on stainless steel (SS) is the average force to remove a hydrocolloid adhesive, laminated under specified conditions on an SS panel, from the SS panel at constant speed and at an angle of 90°.

Procedure

Clean the SS panel with solvent. Cut a hydrocolloid sample of 25.4 mm width and reinforce with reinforcing tape, laminate a paper strip at one end of the hydrocolloid sample using an overlap of about 1 cm. Remove the liner from the hydrocolloid sample and laminate the sample on the SS panel with a 450 gm roller at a speed of 150 cm/min. Allow the sample to dwell for 1 minute. Place the paper strip in the upper clamp and the SS-panel on the lower clamp, making sure that the angle between peel direction and SS-panel on the lower clamp, making sure that the angle between peel direction and SS-panel is 90°. Start the measurement using a crosshead speed of 300 mm/min. The angle must be kept at 90° until the measurement is completed. The 90° peel adhesion is the average force to remove the hydrocolloid strip from the SS-panel.

Static Shear of Hydrocolloid Adhesives Static shear is the time necessary to remove a hydrocolloid adhesive, laminated on a stainless steel panel under specified conditions, from the test panel under influence of a specified weight.

Procedure

Condition the hydrocolloid samples at 23±1° and 50±2% relative humidity for 24 hours. Clean the SS shear panel with solvent. Cut a hydrocolloid strip of 25.4 mm width and 50 mm length. Reinforce the hydrocolloid strip with reinforcing tape. Laminate the hydrocolloid strip on the test panel using an overlap surface of 1 inch². Protect the free hydrocolloid with release liner. Put a weight of 500 g on the laminate for 1 hour. Reinforce the free hydrocolloid adhesive zone with reinforcing plastic and perforate. Place the test panel with hydrocolloid on the shear bar using a shear weight of 500 g. Re-zero the registration clock. Note the time on the clock when sample falls off under influence of the 500 g weight. This completes the measurement.

Static Absorption of Hydrocolloids

To determine the amount of fluid uptake into a known surface of hydrocolloid adhesive.

Procedure

Laminate release liner to the upper flange of the cup with the double coated tape. This is the contact zone for the hydrocolloid. Fill the cup with 30 ml NaCl solution (0.9%wt). Cut a sample of hydrocolloid of about the same size as the outer cup diameter. Weigh the sample ($W_1$). Laminate the sample to the cup, making sure that the seal between the hydrocolloid sample and the cup is watertight. Turn the cup upside down and put it in the oven at 37° C. for 24 hours. Cool down. Remove the hydrocolloid from the cup and reweigh ($W_2$). Calculate the water fluid absorption (g/sq.m.24 h) using the formula:

$$abs = (W_2 - W_1)/0.002375$$

where the area of the hydrocolloiod in contact with salt solution is 0.002375 sq.m.

Determination of Cold Flow

The flow of the hydrocolloid under influence of a specified pressure and after a specified time, is measured.

Procedure

Condition the hydrocolloid samples at 23±10° C. and 50±2% relative humidity for 24 hours. Cut samples of hydrocolloid using a 35 mm circular die-cutter. Put a silicone paper on top of a first glass plate. Arrange the 5 samples on the silicone paper in a way that pressure is distributed equally. Measure the diameter of each sample with callipers, mark the exact place where the measurement is done. Put a plastic disk on each sample. Put another silicone papeer and two glass plates over the construction followed by a weight of 10 kg. (The measurement can also be done by placing the sample with the disk and the 10 kg weight in an oven maintained at 40° C.). After 24 hours, measure the diameter of the samples where they are marked. Calculate the % increase of diameter of the samples. The cold flow is the % increase of diameter after 24 hours exposure to 10 kg (for 5 samples). Record the % increase in diameter and the test temperature.

Determination of the Integrity of Hydrocolloids

The integrity of a hydrocolloid is defined as its ability to resist breakdown by biological fluids. The test measures the weight percentage of hydrocolloid adhesive retained after exposure to saline under specified conditions.

Procedure

Condition the hydrocolloid samples at 23±1° C. and 50±2% relative humidity for 24 hours. Cut circular samples 2.54 cm in diameter from hydrocolloid sheet. Weigh and record the samples ($W_i$). Place each sample in a bottle with 50 ml aqueous saline (0.9%wt). Cap the bottles and agitate on the bottle shaker at 400 speed for a period of 18 hours. Remove the sample and dry it in the circulating air oven at 50° C. and 50% relative humidity until dry. This takes about 24 hours. Weigh and record the sample ($W_f$). The Integrity Value of the sample is calculated using the following equation:

$$\text{Integrity Value } (\%) = 100 \times \frac{(W_f)}{(W_i)}$$

EXAMPLES 14–18

These examples show the effect of including a small amount of tackifier as an optional additive.

Using the intermediate hot melt adhesive prepared exactly as described in Example 13 above, a further hot melt adhesive was prepared containing 13.7% of Regalite R91, a synthetic, cycloaliphatic resin available from the Hercules Chemical Company. This intermediate formulation is referred to as Formula 2–74A in the Table 15.

Similarly, another intermediate hot melt adhesive was prepared by adding Regalite R91 to the hot melt designated as E3 in Table 3. This intermediate formulation is referred to as 2–75B in Table 16.

TABLE 15

| | 2-74A | Amount in Mix, gm | wt. % |
|---|---|---|---|
| Formula 2-66A 491.7 gm (see Table 12) | Regalite R91 | 78.05 | 13.70 |
| | Vector 4111 | 97.55 | 17.12 |
| | LVSI-101 | 390.26 | 68.50 |
| | Irganox 1010 | 3.86 | 0.68 |
| | Total | 569.74 | 100.00 |

TABLE 16

| | 2-75B | Amount in Mix, gm | wt. % |
|---|---|---|---|
| Formula E3 497.9 gm (see Table 3) | Regalite 91 | 100.00 | 16.73 |
| | Kraton D-1117 | 165.14 | 27.62 |
| | LVSI-101 | 330.28 | 55.24 |
| | Irganox 1010 | 2.48 | 0.41 |
| | Total | 597.90 | 100.00 |

From these two Regalite containing formulations, four new hydrocolloid adhesives were prepared, Examples 14–17 in Table 17.

TABLE 17

| wt % | Ex 14 | Ex 15 | Ex 16 | Ex 17 |
|---|---|---|---|---|
| Regalite R91 | 7.60 | 7.63 | 11.71 | 9.37 |
| Vector 4111 | 9.85 | 9.54 | — | — |
| Kraton D-1117 | — | — | 19.33 | 15.48 |
| LVSI-101 | 38.00 | 38.16 | 38.67 | 30.95 |
| Irganox 1010 | 0.38 | 0.38 | 0.29 | 0.23 |
| Aquasorb A500 | 35.31 | 11.80 | 30.00 | 10.99 |
| NaCMC 7H4xF | — | 11.80 | — | 10.99 |
| Pectin USP100 | — | 11.80 | — | 10.99 |
| Vistanex LMMH | 8.87 | 8.90 | — | 10.99 |
| Total | 100.00 | 100.00 | 100.00 | 100.00 |

Examples 14–17 were evaluated using the battery of tests described below. Not all tests were always done on every formulation. The results are given in Table 18.

TABLE 18

| | Example 14 | Example 15 | Example 16 | Example 17 |
|---|---|---|---|---|
| Reverse tack N/in | 19.5 | 18.3 | 15.4 | 19.9 |
| Peel 90° s.s. N/in | 8.8 | 8.2 | 8.5 | 12.3 |
| Shear 0.5 kg, min | 482 | 1170 | 1246 | >2000 |
| Thickness, mm | 0.84 | 0.60 | 0.81 | 0.85 |
| Static Absorption gm/m$^2$/24 hr | 4518 | 3099 | 2341 | 3002 |

Additional Test Data

Using the test described below for Degree of Integration, the following data were obtained.

TABLE 19

| Example No. | Degree of Integration, % |
|---|---|
| 9 | 96 |
| 12 | 94 |
| 13 | 95 |
| 14 | 98 |
| 15 | 100 |
| 16 | 87 |
| 17 | 89 |
| Commercial product 1 | 89 |
| Commercial Product 2 | 89 |
| Commercial product 3 | 75 |
| Commercial product 4 | 7 |
| Commercial product 5 | 42 |

A number of conclusions can be drawn from these data. Examples 16 and 17 have larger amounts of conventional tackifier than Examples 14 and 15. It appears from the above data that the larger amount of tackifier leads to a slightly less well integrated system. Also, comparing Examples 14 and 15, the difference is that Example 14 contains an insoluble absorbent, while Example 15 contains the same amount by weight of a blend of absorbents, two thirds of which is soluble. In spite of this difference in composition, the degree of integration in each case is very high and virtually identical, 98% and 100%, respectively. This shows that the integrating network formed by the liquid rubber and the solid rubber combination of the instant invention is extremely effective in forming non-leachable hydrocolloid compositions. The data also show that the preferred products of the invention (products containing no, or small, amounts of conventional tackifier) are more integrated than any other commercially available hydrocolloid adhesive, when evaluated using this test method.

What is claimed is:

1. A pressure-sensitive adhesive material comprising a mixture of:
   (a) a continuous phase formed from a physically cross-linked solid rubber, a compatible liquid rubber, other than polyisobutylene and 0 to 9.37 wt. % of tackifiers other than said rubbers, based on the total composition, wherein the weight ratio of said liquid rubber to said solid rubber is from 3:2 to 7:1; and
   (b) 10 to 70% by weight, based on the total adhesive material, of a discontinuous phase comprising one or more hydrophilic polymers that are soluble and/or swellable in water.

2. An adhesive material according to claim 1 wherein the discontinuous phase includes at least one insoluble but water-absorbent and swellable polymer.

3. An adhesive material according to claim 2 wherein the water insoluble polymer is selected from cross-linked sodium carboxymethyl cellulose, crystalline sodium carboxymethyl cellulose, cross-linked dextran, calcium alginate, starch-acrylonitrile graft polymer, starch sodium polyacrylate, gluten, polymers of methylvinyl ether and maleic acid and derivatives thereof.

4. An adhesive material according to claim 1 wherein the discontinuous phase includes one or more water soluble hydrocolloids.

5. An adhesive material according to claim 4 wherein the soluble hydrocolloid is selected from sodium carboxymethyl cellulose, pectin, gelatin, guar gum, locust bean gum, collagen, karaya gum, alginic acid, sodium alginates, sodium-calcium alginates, polyvinyl alcohol, polyvinyl pyrrolidone, polyethylene glycols and polypropylene glycol.

6. An adhesive material according to claim wherein the hydrophilic polymer phase (b) comprises 20 to 55% by weight of the total adhesive material.

7. An adhesive material according to claim 1 wherein the cross-linked solid rubber of the continuous phase (a) includes at least one linear or radial A-B-A block copolymer based on styrene-butadiene, styrene isoprene or hydrogenated styrene-diene copolymers.

8. An adhesive material according to claim 7 wherein the continuous phase (a) comprises up to 85% by weight relative to the A-B-A block copolymer(s) of one or more styrene-butadiene, styrene isoprene or hydrogenated styrene-diene AB block copolymers.

9. An adhesive material according to claim 8 wherein the AB block copolymer(s) are present in an amount of 10 to 50% by weight relative to the A-B-A block copolymer(s).

10. An adhesive material according to claim 1 wherein the liquid rubber has a molecular weight of 25,000 to 50,000.

11. An adhesive material according to claim 1 wherein the liquid rubber has a glass transition temperature of less than −50° C.

12. An adhesive material according to claim 1 wherein the liquid rubber has a viscosity at 38° C. to 50 to 1000 Pas.

13. An adhesive material according to claim 1 wherein the weight ratio of liquid rubber to solid rubber within the continuous phase (a) is at least 2:1.

14. An adhesive barrier or dressing for medical use, comprising a non-adhesive, waterproof film having coated thereon a layer of a pressure-sensitive adhesive material according to claim 1.

15. An adhesive barrier or dressing for medical use, comprising a non-adhesive, waterproof film having coated thereon a layer of pressure-sensitive adhesive material according to claim 1.

16. An adhesive material according to claim 1 wherein said continuous phase (a) additionally contains up to 80% by weight of at least one polyisobutylene having a viscosity average molecular weight of 36,000 to 70,000.

17. An adhesive material according to claim 1 which contains not more than 5% by weight of resinous material other than low molecular weight polymers and said rubbers.

18. An adhesive material according to claim 1 which contains no resinous materials other than low molecular weight polymers and said rubbers.

* * * * *